United States Patent [19]

Webb et al.

[11] Patent Number: 5,690,549
[45] Date of Patent: Nov. 25, 1997

[54] ROOF FOR A VEHICLE CAB

[75] Inventors: Stephen M. Webb, Shenfield; Robert Samuel David Whybro, Butnham on Crouch, both of Great Britain

[73] Assignee: New Holland North America, Inc., New Holland, Pa.

[21] Appl. No.: 613,829

[22] Filed: Mar. 11, 1996

[30] Foreign Application Priority Data

Mar. 18, 1995 [GB] United Kingdom ............... 9505539

[51] Int. Cl.$^6$ ............................................. B60H 1/32
[52] U.S. Cl. ........................ 454/137; 454/136; 454/156
[58] Field of Search ........................ 165/42, 43; 454/136, 454/137, 138, 139, 151, 156

[56] References Cited

U.S. PATENT DOCUMENTS

| | | | |
|---|---|---|---|
| 3,868,896 | 3/1975 | Doll et al. | 454/137 |
| 4,189,987 | 2/1980 | Amberg et al. | 454/137 |
| 4,641,502 | 2/1987 | Aldrich et al. | 454/136 X |
| 4,658,598 | 4/1987 | Schulz | 454/136 X |
| 4,721,031 | 1/1988 | Nakata et al. | 454/137 X |
| 5,342,238 | 8/1994 | Segerpalm et al. | 454/136 |

FOREIGN PATENT DOCUMENTS

| | | | |
|---|---|---|---|
| 57-107911 | 7/1982 | Japan | 454/137 |
| 1066846 | 1/1984 | U.S.S.R. | 454/137 |
| 1495146 | 7/1989 | U.S.S.R. | 454/137 |

*Primary Examiner*—Harold Joyce
*Attorney, Agent, or Firm*—Larry W. Miller; John W. Stader; Frank A. Seemar

[57] ABSTRACT

A roof for the cab of vehicle is constructed with a hollow plastic body that is molded in one piece with a blower and a heat exchanger fitted to the hollow body. The hollow body defines a cavity that forms an air duct through which air for ventilating the cab is ducted. Shuttered external and internal air intake vents allow the selection between fresh air from externally of the cab and recirculated air from within the cab. A well open through the roof provides an emergency exit from the vehicle cab.

11 Claims, 2 Drawing Sheets

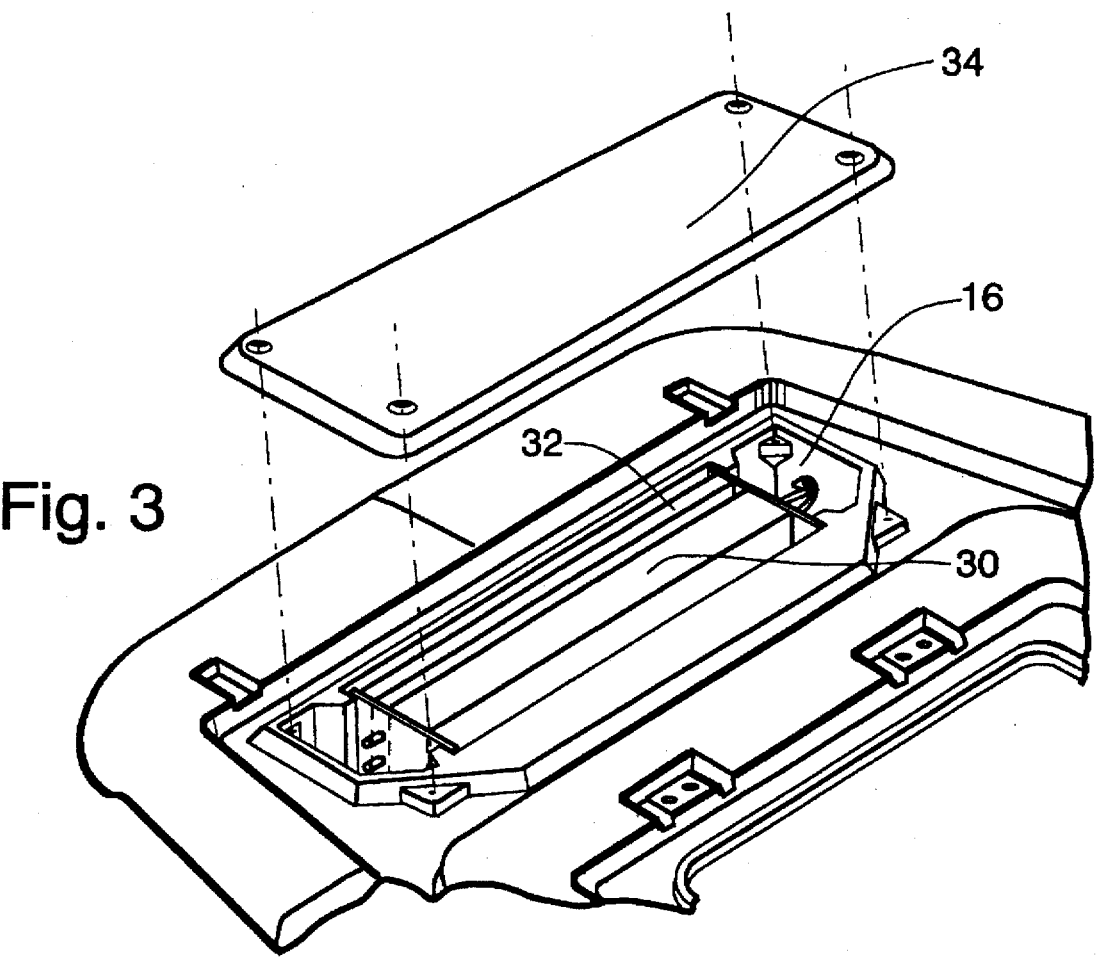

ROOF FOR A VEHICLE CAB

BACKGROUND OF THE INVENTION

The present invention relates to a roof for the driver's cab of a vehicle, especially an agricultural vehicle such as a tractor or a combine harvester. It is already known to form a cab roof as a hollow body and to fit a ventilation system in the roof cavity. Such a roof is described in Great Britain Patent Application No. 2,030,084 in which the roof is formed from assembled parts consisting of an upper covering, a lower closure part and an inner profiled covering. A blower, a heat exchanger and intake air filters are all mounted within the roof cavity, the outlet duct of the blower passing through the lower closure part to blow heated or cooled air into the cab.

Though the above roof simplifies the installation of a ventilation system by mounting most of its components in the roof cavity it does suffer from certain disadvantages. In particular, because the roof is formed from assembled parts, its structural rigidity is impaired and extra steps need to be taken to assemble the parts to one another and to provide a proper seal between the parts so that only filtered air may be drawn in by the blower.

SUMMARY OF THE INVENTION

With a view to mitigating the foregoing disadvantages, the present invention provides in accordance with a first aspect a roof for the cab of a vehicle, comprising a hollow plastics body that is molded in one piece, and a blower and heat exchanger fitted to the hollow body, the cavity within the hollow body forming an air duct through which air for ventilating the cab is ducted.

By forming the hollow body as a one piece molding, the invention achieves improved structural rigidity and simplifies assembly by avoiding the need to secure the parts to one another and to provide a seal between them.

It is preferred that the plastics body should be formed by a rotation molding technique. In rotation molding, a plastics material is placed in a sealed mould and heated. While the plastics material can flow, the mould is rotated in all directions to ensure that the plastics material coats all the interior surface of the mould. The plastics material is then allowed to cool or to set so as to form a hollow body having the same shape as the mould cavity. Such a technique, which is known per se and is used for example to manufacture fuel tanks, lends itself well to the manufacture of a roof of the invention.

It is preferred to mould the plastics body with an inner partition wall that extends between the upper and lower roof surfaces, the inner cavity thereby being formed as a toroid surrounding the partition wall.

Such a construction improves still further the rigidity of the roof and provides a convenient well bounded by the partition wall in which parts of the ventilation system may be mounted.

The latter well is open from above and below, thereby allowing the components of the ventilation system to be assembled into the well from outside the vehicle. This considerably simplifies assembly by avoiding the need to work within a confined space when connecting coolant pipes and electrical leads to the ventilation system. A lid may be provided to close the well from above after assembly of the ventilation system has been completed.

It is desirable to form an aperture in the partition wall and to mount the blower of the ventilation system within the aperture. The blower may then draw air from the inner cavity of the roof and deliver it to the cab by way of the well defined by the partition wall.

The roof preferably overhangs the cab and air intake vents, suitably fitted with air filters, may be formed in downward facing surfaces of the overhanging portions of the roof to allow ambient air to be drawn into the roof cavity. If desired, further intake vents may be formed in regions of the roof lying within the cab. Shutters may then be provided to close the interior and exterior air intake vents selectively and allow the driver to select between fresh air, recirculated air, or a combination of the two.

In the preferred embodiment of the invention, the roof is formed with a further well, covered by a hinged door and serving as an emergency escape hatch. The inner cavity in this preferred embodiment of the invention is shaped as a Fig. "8". The hinged door may, if desired, be made of glass to act as a sunshine roof.

It is an advantage of rotation molding that it is possible to integrate into the plastics molding metal fittings, such as captive nuts, to allow the components of the ventilation system, the lid covering the heat exchanger well and the hinged door of the escape hatch to be bolted to the molding in a simple and secure manner.

According to a second aspect of the invention, there is provided a roof for the cab of a vehicle, comprising a hollow body having spaced upper and lower walls defining a cavity in communication with the ambient air, a partition extending between the upper and lower walls and defining a well that is open at least at its lower end, a blower mounted in the partition for drawing air from the cavity of the hollow body and delivering the air into the interior of the vehicle cab by way of the well, and a heat exchanger mounted within the well for heating and/or cooling the air blown by the blower.

By providing a partition between the upper and lower walls of the hollow roof body, the invention in this second aspect improves the strength of the hollow body and divides the space within it into a negative pressure region and a positive pressure region, on opposite sides of the blower, the high pressure region being bounded by the partition and containing the heat exchanger. Because the entire volume of the well is under high pressure, the vents for delivering the air into the cab may be positioned anywhere within the well, their position not being dictated by the location of the blower. By placing the heat exchanger on the high pressure side of the blower, one may achieve a more even flow of air and better thermal efficiency. Furthermore, the well and the heat exchanger mounted within it act to reduce the sound reaching the cab from the motor of the blower.

The well is preferably initially open at both ends and subsequently closed from above by a separately formed lid after assembly of the blower and the heat exchanger. This allows the components of the ventilation system to be installed from outside the vehicle cab and thereby simplifies assembly.

BRIEF DESCRIPTION OF THE DRAWINGS

A roof for a vehicle cab in accordance with the present invention will now be described, by way of example, with reference to the accompanying drawings, wherein:

FIG. 3 is a similar detail to FIG. 2, showing a later stage in the assembly of the ventilation system into the roof of FIG. 1.

DETAILED DESCRIPTION OF THE PREFERRED EMBODIMENT

Figure 1:
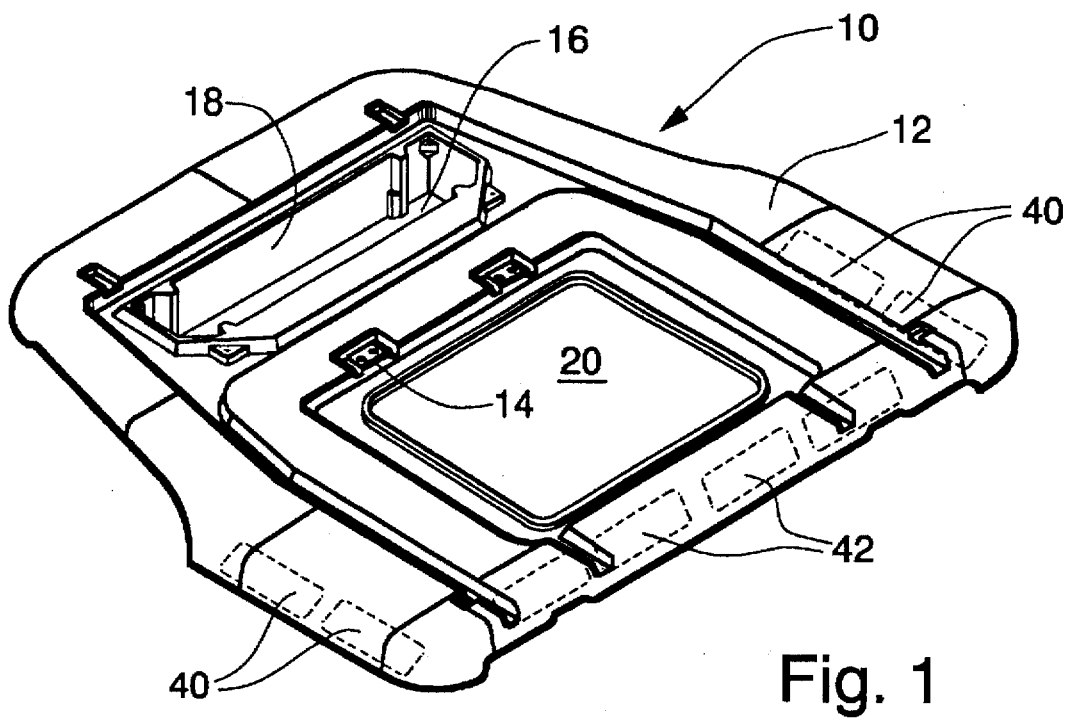
FIG. 1 is a perspective view of a roof of the invention prior to the installation of the ventilation system.

Referring now to FIG. 1, a roof 10 is shown for the cab of a tractor, the roof being constructed by a rotation molding process as a one-piece hollow plastics body 12 with various metal fittings, such as captive nuts 14, cast in situ in the plastics molding. The body 12 is formed with a deep well 16 that is defined by a partition 18 extending between the upper and lower walls of the plastics body. The body 12 is also formed with a second shallower well 20 that acts as an escape hatch. The escape hatch in use is closed by a hinged glass door (not shown) that doubles as a sunshine roof. The hinges of the hinged door are bolted into the captive nuts 14 that are molded integrally in the plastics body 12.

Figure 2:
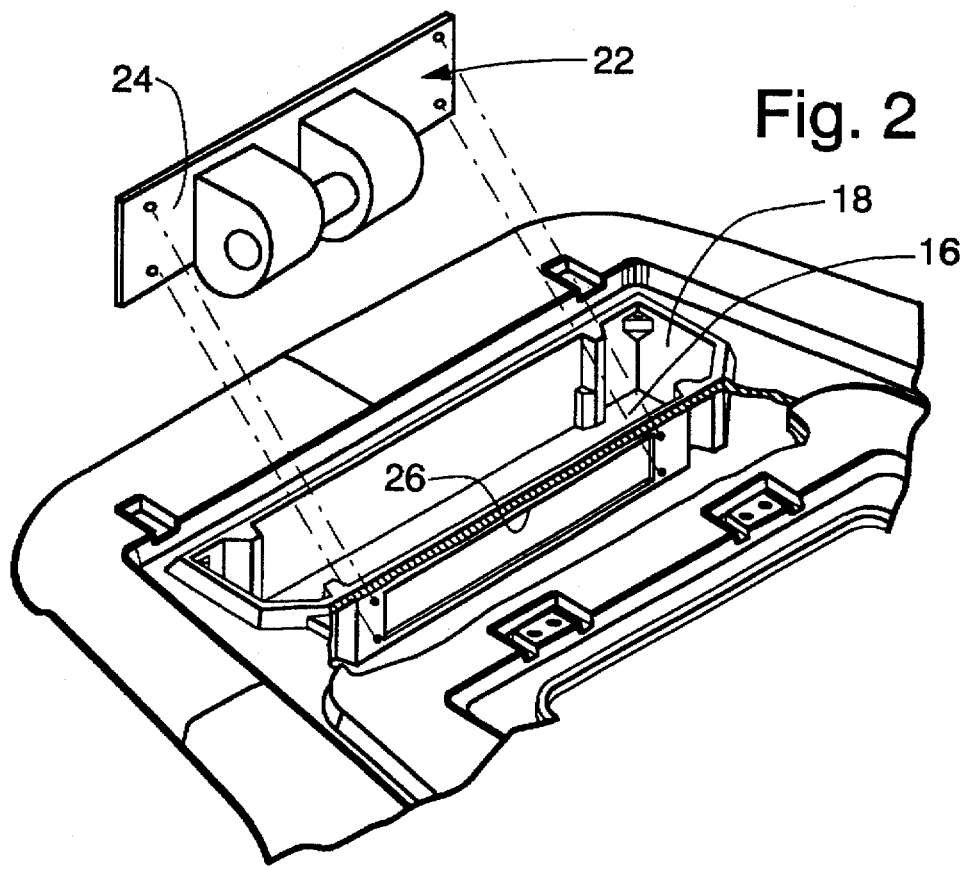
FIG. 2 is a partly cut away view of a detail of the roof shown in FIG. 1, illustrating the manner in which a blower of the ventilation system is mounted in the roof.

The deep well 16 is provided for the purpose of receiving some of the components of the ventilation system for the vehicle cab. After molding the body 12, a cut-out 26 is formed in one side of the partition 18. As shown in FIG. 2, a blower 22 is mounted in this cut-out 26. The blower 22 has a mounting plate 24 that covers the cut-out 26 and is fixed to the wall of the partition by screws or bolts. During operation, the blower creates a low pressure within the interior cavity of the body 12 and a high pressure in the well 16.

The roof also has fixings, not shown, for mounting it to the pillars of the vehicle cab. Through these hollow pillars, wires and pipes are passed to the parts of the ventilation system mounted in the roof.

The roof, when fitted to the tractor, overhangs the cab and within the overhang, the roof has downward facing air vents 40 (shown in dotted lines in FIG. 1) through which ambient air can be drawn into the interior cavity of the hollow body 12 of the roof. These vents may be fitted with filters and, if desired, with shutters to enable them to be closed when required. Further vents 42 (also shown in dotted lines in FIG. 1) are provided in the region of the roof lying within the cab and these too may be fitted with shutters. By suitably setting the shutters associated with the various vents, the driver can arrange for the roof cavity to receive ambient air from within the cab, from outside the cab, or a mixture of the two. In this way, the ventilation system may be set to introduce fresh air into the cab or to recirculate the air within the cab.

The air drawn by the blower 22 from the interior cavity of the roof, which acts as a supply duct to the blower 22, is introduced under pressure into the well 16 within which there is mounted an assembly that includes a heat exchanger 30 through which engine coolant circulates. The heat exchanger is connected to the engine cooling system by pipes that pass through one of the roof pillars on one side of the cab. The assembly mounted in the well 16 also includes an evaporator 32 of an air conditioning circuit that is connected to an engine driven compressor by means of pipes passing through a pillar on the other side of the cab. Because the well 16 is open from above and below, all the electrical and pipe connections to the parts of the ventilation system mounted in the roof 10 can be made from outside the vehicle. After the assembly has been lowered into the roof well 16 and the various connections to it are made, the well 16 is closed by a lid 34 (see FIG. 3) that is bolted into further captive nuts molded into the roof body.

For improved appearance and insulation, a roof lining (not shown) may be placed over the undersurface of the roof body 12. Vents for directing the air flow from the blower and shutters for the interior mounted air intake vents may be located in the roof lining. At least some of the switches for controlling the ventilation system may also, if desired, be mounted in the roof lining.

In use, when the blower 22 is activated, it produces a pressure difference between the roof cavity and the interior of the well. The negative pressure in the roof cavity results in air being drawn in from the vents 40 and/or 42 and following the path of least resistance through the roof cavity to the intake side of the blower 22. Thus, the regions of the roof cavity surrounding the second well 20 act as sealed ducts conveying fresh air or recirculated air to the intake side of the blower 22. Depending on the positions of the shutters associated with the vents 40 and 42, the air delivered to the intake side of the blower will be fresh air and/or air recirculated from the cab. Fresh air is to be preferred but recirculation allows improved heating and cooling in extreme weather conditions.

The air delivered by the blower 22 passes over the heat exchanger 30 and the evaporator 32 and is heated or cooled in the process. The air is then delivered from the well 16 to the interior of the cab through vents in the roof lining that are conveniently located for the driver and allow the driver to direct the warm or cool air flow as desired. Because the well 16 is located at the forward end of the roof, it is possible for the driver to rotate the vents in the roof lining in order to direct the air flow towards the windscreen, so that the ventilation system may also be used for de-misting. The cab is also vented in the normal way so that the air blown into the cab can escape to the ambient atmosphere. If this vent is restricted while the blower is used to introduce fresh air into the cab, then a positive pressure is maintained within the cab to keep out dust and polluted air.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A roof for the cab of a vehicle, comprising:
    a hollow plastic body that is molded in one piece and defining a cavity therein, said plastic body including an inner partition wall extending between an upper roof surface and a lower roof surface, the cavity being formed as a toroid surrounding the partition wall; and
    a blower and heat exchanger fitted to the hollow body, the cavity within the hollow body forming an air duct through which air for ventilating the cab is ducted.

2. The roof of claim 1 wherein said partition wall forms a well open from above and below, thereby allowing the components of the ventilation system to be assembled into the well from outside the vehicle.

3. The roof of claim 2 further comprising:
    a lid provided to close the well from above after assembly of the ventilation system has been completed.

4. The roof of claim 3 wherein an aperture is formed in the partition wall for the mounting of the blower of the ventilation system.

5. The roof of claim 4 further comprising:

exterior air intake vents formed in downward facing surfaces of overhanging portions of the roof so as to be located outside the cab to allow ambient air to be drawn into the roof cavity.

6. The roof of claim 5 further comprising:

interior intake vents formed in regions of the roof to be positioned within the cab.

7. The roof of claim 6 wherein shutters are provided to close the interior and exterior air intake vents selectively and allow the selection between fresh air from externally of the cab and recirculated air from within the cab.

8. The roof of claim 7 wherein said well is covered by a hinged door to serve as an emergency escape hatch from within the cab.

9. The roof of claim 8 wherein the hinged door is transparent.

10. A roof for the cab of a vehicle comprising:

a hollow body having spaced upper and lower walls defining a cavity, said body having at least one opening in communication with the ambient air;

a partition wall extending between the upper and lower walls and defining a well open into the cab, said cavity being formed as a toroid surrounding the partition wall;

a blower mounted on the partition for drawing air from the cavity of the hollow body and delivering the air into the vehicle cab by way of the well; and a heat exchanger mounted within the well for selectively heating and cooling the air blown by the blower.

11. The roof of claim 10 wherein the well is also open through the upper wall, said roof further including a lid to close the well after assembly of the blower and the heat exchanger.

* * * * *